United States Patent
Sung et al.

(10) Patent No.: US 10,580,188 B2
(45) Date of Patent: Mar. 3, 2020

(54) METHOD OF CREATING ANIMATED IMAGE BASED ON KEY INPUT, AND USER TERMINAL FOR PERFORMING THE METHOD

(71) Applicant: KAKAO CORP., Jeju-si, Jeju-do (KR)

(72) Inventors: Kyung Ho Sung, Bucheon-si (KR); Ji Hyung Hong, Seoul (KR); Ji Soo Hwang, Seoul (KR); Hye Won Shin, Uijeongbu-si (KR); Hyun A Kim, Yongin-si (KR); Yea Joon Park, Seongnam-si (KR); Shin Hyang Oh, Yongin-si (KR)

(73) Assignee: KAKAO CORP., Jeju-si, Jeju-Do (KR)

( * ) Notice: Subject to any disclaimer, the term of this patent is extended or adjusted under 35 U.S.C. 154(b) by 0 days.

(21) Appl. No.: 16/122,027

(22) Filed: Sep. 5, 2018

(65) Prior Publication Data

US 2019/0073817 A1 Mar. 7, 2019

(30) Foreign Application Priority Data

Sep. 5, 2017 (KR) .................. 10-2017-0113524

(51) Int. Cl.

| | |
|---|---|
| *G06T 13/80* | (2011.01) |
| *G10L 15/08* | (2006.01) |
| *G06T 11/00* | (2006.01) |
| *G10L 15/02* | (2006.01) |
| *G06F 3/16* | (2006.01) |
| *H04M 1/725* | (2006.01) |
| *G10L 15/26* | (2006.01) |

(52) U.S. Cl.
CPC .............. *G06T 13/80* (2013.01); *G06F 3/167* (2013.01); *G06T 11/001* (2013.01); *G10L 15/02* (2013.01); *G10L 15/08* (2013.01); *G10L 15/26* (2013.01); *G10L 2015/027* (2013.01); *G10L 2015/086* (2013.01); *H04M 1/72555* (2013.01); *H04M 2250/22* (2013.01); *H04M 2250/52* (2013.01)

(58) Field of Classification Search
None
See application file for complete search history.

(56) References Cited

U.S. PATENT DOCUMENTS

| | | |
|---|---|---|
| 2008/0174667 A1 | 7/2008 | Okada et al. |
| 2010/0166399 A1 | 7/2010 | Konicek |

(Continued)

FOREIGN PATENT DOCUMENTS

| | | |
|---|---|---|
| JP | 1997233442 A | 9/1997 |
| JP | 200387617 A | 3/2003 |

(Continued)

OTHER PUBLICATIONS https://www.youtube.com/watch?v=_jVmQYrTggE (Year: 2016).*

(Continued)

*Primary Examiner* — Vu Nguyen
(74) *Attorney, Agent, or Firm* — Cantor Colburn LLP

(57) ABSTRACT

A method of creating an animated image based on a key input, and a user terminal for performing the method are provided. The method includes acquiring a snapshot image using a camera installed in a user terminal every time a key is input to the user terminal, and creating an animated image by merging the acquired snapshot image with the input key.

16 Claims, 6 Drawing Sheets

(56) References Cited

U.S. PATENT DOCUMENTS

2011/0314113 A1* 12/2011 Noda ................... G06F 3/0481
                                                                       709/206
2017/0046059 A1* 2/2017 Karunamuni ......... G06F 3/0488
2017/0357442 A1* 12/2017 Peterson .............. G06F 3/0482

FOREIGN PATENT DOCUMENTS

| JP | 2003348567 A | 12/2003 |
|----|--------------|---------|
| JP | 2005109648 A | 4/2005 |
| JP | 200953560 A | 3/2009 |
| JP | 2009141555 A | 6/2009 |
| JP | 201066844 A | 3/2010 |
| JP | 2010244089 A | 10/2010 |
| JP | 2014219767 A | 11/2014 |
| KR | 19950007027 B1 | 6/1995 |
| KR | 101398781 B1 | 5/2014 |
| KR | 1020150009186 A | 1/2015 |
| KR | 1020150109764 A | 10/2015 |
| WO | 0008585 A2 | 2/2000 |
| WO | 2004017632 A1 | 2/2004 |

OTHER PUBLICATIONS

"[IPhone Self-Camera Application] Snow", Sep. 6, 2016, Retrieved from Internet, <URL:http://snoopyjjoa.tistory.com/165>.
"Snow Vs Kakaotalk Cheese", Oct. 2016, Retrieved from Internet, <URL:http://navercast.naver.com/magazine_contents.nhn?rid=1103&contents_id=124095> <URL:http://monthly.appstory.co.kr/apps9118>.
Japanese Office Action for corresponding JP Patent Application No. 2018-165693 dated Nov. 5, 2019.

* cited by examiner

METHOD OF CREATING ANIMATED IMAGE BASED ON KEY INPUT, AND USER TERMINAL FOR PERFORMING THE METHOD

CROSS-REFERENCE TO RELATED APPLICATION(S)

This application claims the benefit of Korean Patent Application No. 10-2017-0113524, filed on Sep. 5, 2017, in the Korean Intellectual Property Office, the disclosure of which is incorporated herein by reference.

BACKGROUND

1. Field of the Invention

One or more example embodiments relate to a method of creating an animated image and a user terminal for performing the method, and more particularly, to a method of creating an animated image by encoding snapshot images acquired every time a user enters a key, and a user terminal.

2. Description of the Related Art

An existing animated image is reconstructed by a user as a graphics interchange format (GIF) file using separate software. The user collects a plurality of still images and adjusts an arrangement of the plurality of still images based on time intervals, so that an animated image is created through a somewhat complicated process. Recently, various applications for creating an animated image in an easier way are being introduced, but a rather cumbersome process for users is still required.

Thus, there is a need for a method of creating an animated image in a form that is easier for a user and that is interesting to a third party.

SUMMARY

Example embodiments provide an apparatus and method for more easily creating an animated image in response to a user simply entering a key.

Example embodiments provide an apparatus and method for creating an animated image based on a result obtained by displaying a snapshot image with a custom sticker, a text corresponding to a key input by a user, and the like, so that a third party who receives the animated image may be interested in the animated image.

According to an aspect, a method of creating an animated image based on a key input includes activating a camera of a user terminal in response to a service request of a user, determining whether a key is input by the user, acquiring a snapshot image using the activated camera every time the key is input, and creating an animated image based on the acquired snapshot image, the animated image changing over time, wherein the key input by the user corresponds to a text.

The text may correspond to a key included in a physical keyboard of the user terminal, a key included in a virtual keyboard on a touch screen of the user terminal, or a syllable or a word recognized as speech by a speech recognition device.

The acquiring of the snapshot image may include acquiring a snapshot image overlaid with a text corresponding to a key input by a user in an image captured in real time by the activated camera. The animated image may be created by combining snapshot images overlaid with the text corresponding to the key.

The acquiring of the snapshot image may include acquiring a snapshot image that is not overlaid with a text corresponding to a key input by a user in an image captured in real time by the activated camera. The animated image may be overlaid with a sentence formed by combining texts corresponding to keys input by the user and may be created, or may be included in a template and created.

Scheme information associated with an application called by selecting the animated image, or link information associated with a web page connected by selecting the animated image may be set for the animated image.

The animated image may be created based on a snapshot image acquired by applying a theme to a text corresponding to a key input by a user in an image captured in real time by the activated camera.

The animated image may be created based on a snapshot image that shows a custom sticker combined with a text corresponding to a key input by a user in an image captured in real time by the activated camera.

The animated image may be created by filtering at least one snapshot image in which a body part of a user is represented beyond a predetermined threshold area, among snapshot images acquired every time the key is input.

The method may further include sharing the animated image with a third party through a chat room or a specific area. An animated image registered by a user may be displayed to be less in size than an animated image registered by the third party in the chat room or the specific area, or an animated image selected by a user may be enlarged and displayed in the chat room or the specific area.

When the animated image is displayed in the chat room or the specific area, and when a predetermined event is satisfied, the animated image may disappear.

According to another aspect, a user terminal for performing a method of creating an animated image based on a key input includes a processor. The processor may be configured to activate a camera of a user terminal in response to a service request of a user, to determine whether a key is input by the user, to acquire a snapshot image using the activated camera every time the key is input, and to create an animated image based on the acquired snapshot image, the animated image changing over time, wherein the key input by the user corresponds to a text.

The text may correspond to a key included in a physical keyboard of the user terminal, a key included in a virtual keyboard on a touch screen of the user terminal, or a syllable or a word recognized as speech by a speech recognition device.

The processor may be configured to acquire a snapshot image overlaid with a text corresponding to a key input by a user in an image captured in real time by the activated camera.

The animated image may be created by combining snapshot images overlaid with the text corresponding to the key.

The processor may be configured to acquire a snapshot image that is not overlaid with a text corresponding to a key input by a user in an image captured in real time by the activated camera. The animated image may be overlaid with a sentence formed by combining texts corresponding to keys input by the user and may be created, or may be included in a template and created.

Scheme information associated with an application called by selecting the animated image, or link information associated with a web page connected by selecting the animated image may be set for the animated image.

The animated image may be created based on a snapshot image acquired by applying a theme to a text corresponding to a key input by a user in an image captured in real time by the activated camera.

The animated image may be created based on a snapshot image that shows a custom sticker combined with a text corresponding to a key input by a user in an image captured in real time by the activated camera.

The animated image may be created by filtering at least one snapshot image in which a body part of a user is represented beyond a predetermined threshold area, among snapshot images acquired every time the key is input.

The processor may be configured to share the animated image with a third party through a chat room or a specific area. An animated image registered by a user may be displayed to be less in size than an animated image registered by the third party in the chat room or the specific area, or an animated image selected by a user may be enlarged and displayed in the chat room or the specific area.

When the animated image is displayed in the chat room or the specific area, and when a predetermined event is satisfied, the animated image may disappear.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
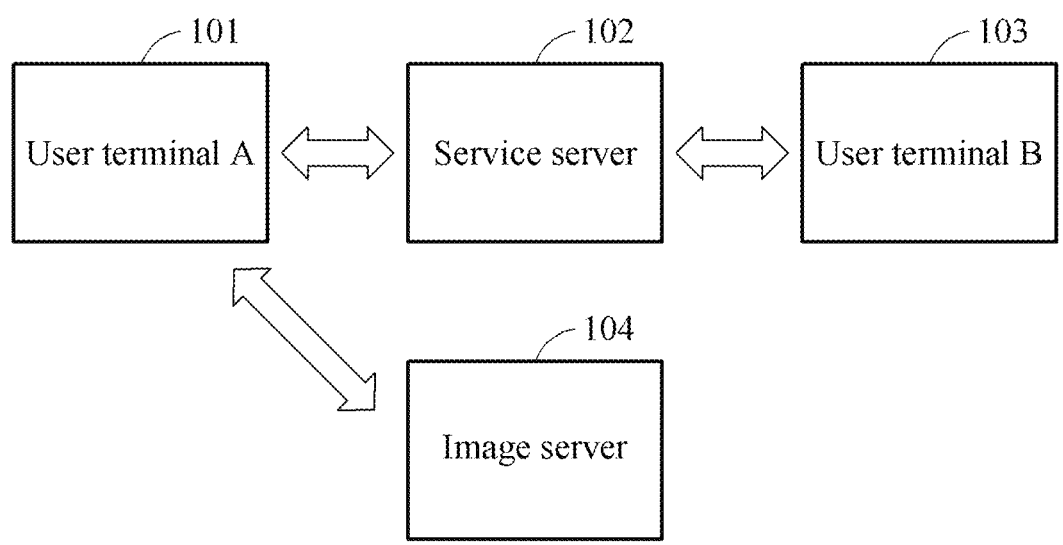
FIG. 1 is a diagram illustrating devices for performing a method of creating an animated image according to an example embodiment.

FIG. 1 is a diagram illustrating devices for performing a method of creating an animated image according to an example embodiment.

FIG. 1 illustrates a user terminal A 101, a service server 102, a user terminal B 103, and an image server 104. The user terminal A 101 refers to a device with a camera capable of capturing an image. The user terminal A 101 may activate the camera in response to a user's request. For example, when a user selects a specific icon or menu to request a service for creating an animated image, the user terminal A 101 may activate the camera and wait for a key input of the user.

According to an example embodiment, in a state in which the camera is activated, a snapshot image may be acquired in a form of a still image or a frame every time a user enters a key corresponding to a text. In other words, entering a key may have the same effect as pressing a shutter of a camera.

In the present disclosure, a key may correspond to a text. A key may be input directly by a user using a physical keyboard or a virtual keyboard on a touch screen. Also, a key may be input by a speech recognition device, for example, a microphone. A syllable or a word recognized as speech may be recognized as a single key.

For example, while the camera is being activated by the user terminal A 101, a user may acquire a snapshot image using the camera by clicking on a key disposed on a physical keyboard or by touching a key of a virtual keyboard on a touch screen. In this example, snapshot images may be acquired every time the user clicks on a key of the physical keyboard or touches a key of the virtual keyboard. A key may correspond to a text input using a numeric key, a letter key, a special symbol key, and the like.

A key input by an utterance or typing on the physical keyboard or the virtual keyboard may be an event to acquire a snapshot image using the camera. For example, a snapshot image corresponding to each of a plurality of events may be acquired. In this example, the snapshot image may be acquired in a form that a text represented by a key input by a user is displayed on the snapshot image. In another example, the snapshot image may be acquired in a form that a text represented by a key input by a user is not displayed on the snapshot image.

Also, a time stamp corresponding to a point in time at which the user enters a key may be set, and a snapshot image may be acquired. In other words, a time stamp may be assigned to each snapshot image. For example, when a user enters text as message "love" using the key, four snapshot images corresponding to a point in time at which a key "l" is clicked, a point in time at which a key "o" is clicked, a point in time at which a key "v" is clicked, and a point in time at which a key "e" is clicked may be acquired. The four snapshot images may be stored together with a point in time at which a key corresponding to metadata is input. Thus, an animated image may be generated based on snapshot images with time stamps that are set.

In this example, when a condition for the animated image is set, for example, when an image change interval in the animated image is set or when a playback time of the animated image is limited, a time stamp assigned to a snapshot image may be utilized to satisfy the condition for the animated image.

When the user selects a specific icon or menu to end a service for creating an animated image, the user terminal A 101 may create an animated image by merging a plurality of snapshot images that are acquired from a start time of the service to an end time of the service. The animated image may be created in a form of an animated graphics interchange format (GIF) file.

The user terminal A 101 may create an animated image that provides an effect of moving over time, by combining snapshot images acquired every time a user enters a key. The animated image may be displayed together with a text that corresponds to a key input when a snapshot image is acquired. The user terminal A 101 may store the animated image in a storage medium, and may play back the animated image using a service application in response to a user's request.

In an example, the user terminal A 101 may create an animated image by filtering at least one snapshot image in which a body part of a user is represented beyond a predetermined threshold area among snapshot images acquired every time a key is input. For example, when a facial area of a user is beyond a predetermined threshold area in a snapshot image, the snapshot image may be filtered during a creation of an animated image.

The user terminal A 101 may transmit the animated image to the service server 102. The service server 102 may provide the animated image to the user terminal B 103 designated from the user terminal A 101 through various service applications (for example, a chat application, a social networking service (SNS) application, a file transfer application, and the like). Accordingly, the animated image created by the user terminal A 101 may be displayed on a service application executed by the user terminal B 103. For example, the animated image may disappear when a preset condition is satisfied (for example, a lapse of a period of time, performing of an event, and the like).

In an example, when an animated image is received from the user terminal A 101, the service server 102 may transfer the animated image to the image server 104, may receive link information associated with a location of the animated image stored in the image server 104, and may transmit the link information to the user terminal B 103. In another example, the user terminal A 101 may transfer the animated image to the image server 104, may acquire link information associated with the animated image, and may transmit the link information to the service server 102.

Figure 2:
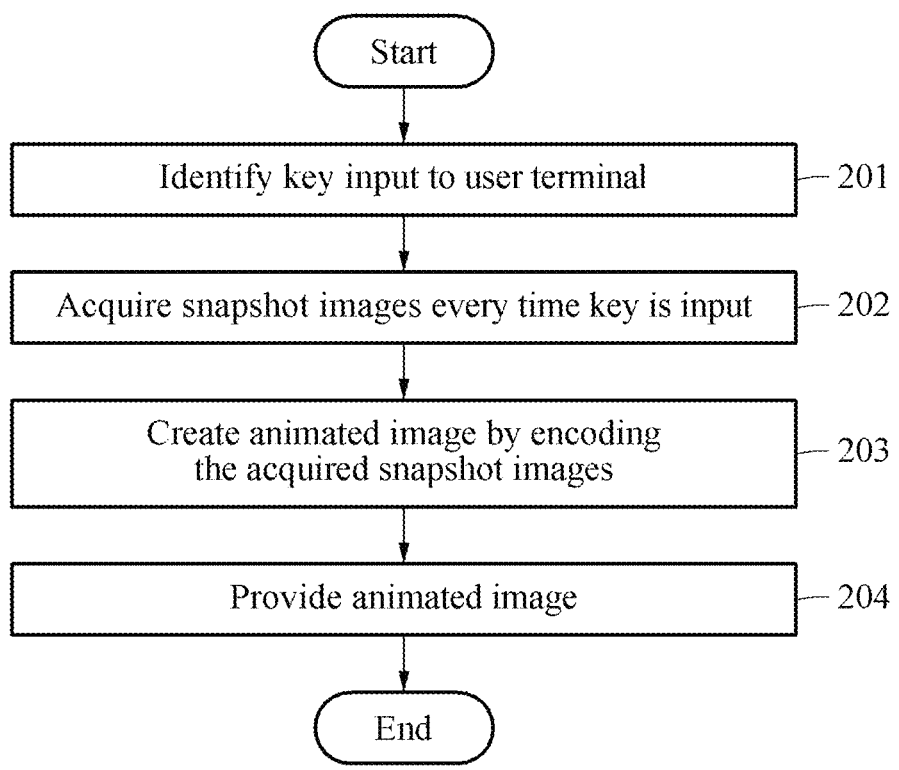
FIG. 2 is a flowchart illustrating a method of creating an animated image according to an example embodiment.

FIG. 2 is a flowchart illustrating a method of creating an animated image according to an example embodiment.

In operation 201, a user terminal may identify a key input. In an example, a user may directly enter a key using a physical keyboard or a virtual keyboard on a touch screen. In another example, a key may be input using a speech recognition device, for example, a microphone. In this example, a syllable or a word recognized as speech may be recognized as a single key. Also, the user terminal may identify a text corresponding to a key.

The user terminal may identify the key input while a camera of the user terminal is being activated, to perform the method. The camera being activated may continue to acquire images using a sensor.

In operation 202, the user terminal may acquire snapshot images every time a key is input. For example, while the camera is being activated, the user terminal may acquire a snapshot image using the camera in response to a user clicking on a key in a physical keyboard or touching a key of a virtual keyboard on a touch screen. In this example, the snapshot image may be acquired every time the user clicks on a key of the physical keyboard or touches a key of the virtual keyboard.

In other words, the user terminal may acquire a snapshot image in a form of a still image by capturing an image acquired by a sensor at a point in time a key is input. The snapshot image may be repeatedly acquired the number of times a key is input by the user while the camera is activated.

In operation 203, the user terminal may create an animated image by encoding a plurality of snapshot images acquired while the camera is being activated. For example, the user terminal may merge snapshot images acquired every time the user enters a key, over time, and may perform encoding. The user terminal may create an animated image having an effect similar to an animation over time, as a result of the encoding. The animated image may be displayed or may not be displayed together with a text the user desires to input when the snapshot image is acquired.

In operation 204, the user terminal may provide the animated image by displaying the animated image on a screen or by transmitting the animated image to a service server. In an example, when the animated image is received from the user terminal, the service server may provide the animated image to a third party who desires to share the animated image in response to a user's request. In another example, when the animated image is received from the user terminal, the service server may transfer the animated image to an image server, and may receive link information associated with a location of the animated image stored in the image server. In this example, the animated image for which the link information is set may be provided to a third party who desires to share the animated image in response to a user's request.

Figure 3:
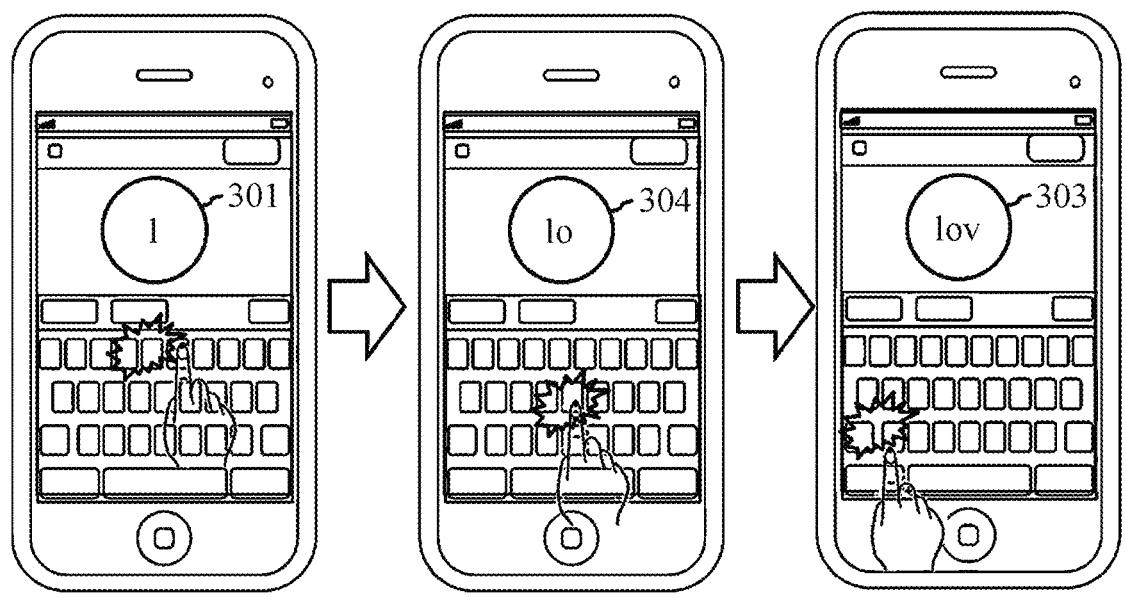
FIG. 3 is a diagram illustrating processes of acquiring snapshot images every time a key is input according to an example embodiment.

FIG. 3 is a diagram illustrating examples of a process of acquiring snapshot images every time a key is input according to an example embodiment.

FIG. 3 illustrates a first process, a second process and a third process to acquire snapshot images when a user enters one of a plurality of keys of a virtual keyboard. FIG. 3 illustrates an operation of a user terminal while a camera is being activated in response to a user's request to start creating of an animated image using an application.

In the first process shown in a left portion of FIG. 3, a user may click on a key "l" of the virtual keyboard. The user terminal may acquire a snapshot image 301 corresponding to clicking of the key "l" in a state in which the camera is activated. The snapshot image 301 may be displayed together with a text "l" corresponding to the key "l" clicked by the user.

In the second process shown in a middle portion of FIG. 3, the user may click on a key "o" of the virtual keyboard. Similarly, the user terminal may acquire a snapshot image 302 corresponding to clicking of the key "o" in the state in which the camera is activated. The snapshot image 302 may be displayed together with a combination "lo" of the text "l" corresponding to the key "l" clicked by the user in the first process and a text "o" corresponding to the key "o" clicked by the user in the second process.

In the third process shown in a right portion of FIG. 3, the user may click on a key "v" of the virtual keyboard. Similarly, the user terminal may acquire a snapshot image 303 corresponding to clicking of the key "v" in the state in which the camera is activated. The snapshot image 303 may be displayed together with a combination "lov" of the text "l" corresponding to the key "l" clicked by the user in the first process, the text "o" corresponding to the key "o" clicked by the user in the second process, and a text "v" corresponding to the key "v" clicked by the user in the third process.

Although an example in which a text corresponding to a clicked key is displayed together with a snapshot image has been described as shown in FIG. 3, example embodiments are not limited thereto. For example, the text may not be displayed together with the snapshot image.

For example, a text corresponding to a key clicked by a user may be displayed on an animated image instead of being displayed a snapshot image. In this example, the text corresponding to the clicked key may be displayed on a specific area, for example, a chat input window, instead of being displayed together with the snapshot image, and may be temporarily stored in a storage medium, for example, a memory and a buffer. When a user sequentially clicks on a plurality of keys, and selects a button or an icon, such as a transmission key, associated with a request to end a process of acquiring a snapshot image and to create an animated image, a user terminal may create an animated image by combining snapshot images acquired before the button and the icon are selected. In an example, a whole sentence formed by combining texts corresponding to keys clicked by a user may be overlappingly displayed on an animated image. In another example, a whole sentence formed by combining texts corresponding to keys clicked by a user may be displayed in a form of a template, for example, a speech balloon, a sticker, and the like, that is distinguished from an animated image.

According to an example embodiment, when a user sends a request to end a creation of an animated image using an application, a user terminal may create an animated image through an encoding process of merging the snapshot images 301, 302 and 303 acquired every time keys are input in the first process through the third processes of FIG. 3. Thus, it is possible to create an animated image that shows an effect that texts corresponding to keys selected by the user are sequentially input over time while objects appearing on the snapshot images 301, 302 and 303 are moving over time.

Figure 4:
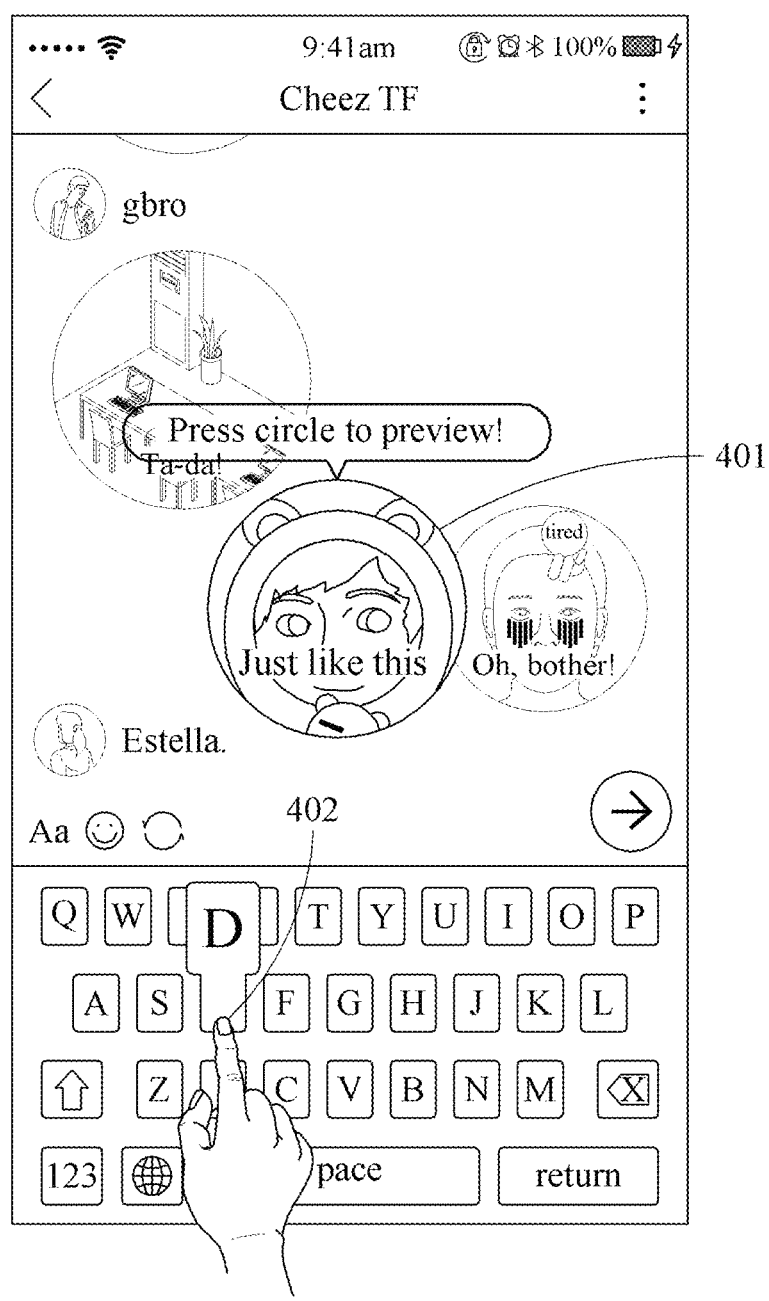
FIG. 4 is a diagram illustrating an example of an animated image according to an example embodiment.

FIG. 4 is a diagram illustrating an example of an animated image according to an example embodiment.

FIG. 4 illustrates an example of an animated image created through an application for creating an animated image. Referring to FIG. 4, an animated image 401 may be created using a snapshot image acquired when a user enters a specific key 402 included in a virtual keyboard.

Referring to FIG. 4, a snapshot image to which a sticker is applied may be combined with a face of the user captured by a camera of a user terminal, so that the animated image 401 may be created. Also, snapshot images that each display a text corresponding to the key 402 input by the user may be combined, so that the animated image 401 may be created. In other words, a sticker may be applied to an image captured in real time by the camera that is being activated in the user terminal, and a snapshot image displayed together with a text corresponding to a key input by a user may be encoded, to create the animated image 401.

As shown in FIG. 4, the animated image 401 may be played back in response to a user's preview request. Since the animated image 401 is actually obtained by connecting snapshot images acquired for each point in time on a time-by-time basis, the animated image 401 may exhibit an effect substantially similar to an animation and may be played back in the same manner as a moving image.

Also, in the animated image 401, a web page link or an application scheme may be added to metadata through an image server. Accordingly, when a user selects the animated image 401, a user terminal may move to a web page via a link, or may call an application via the application scheme.

Figure 5:
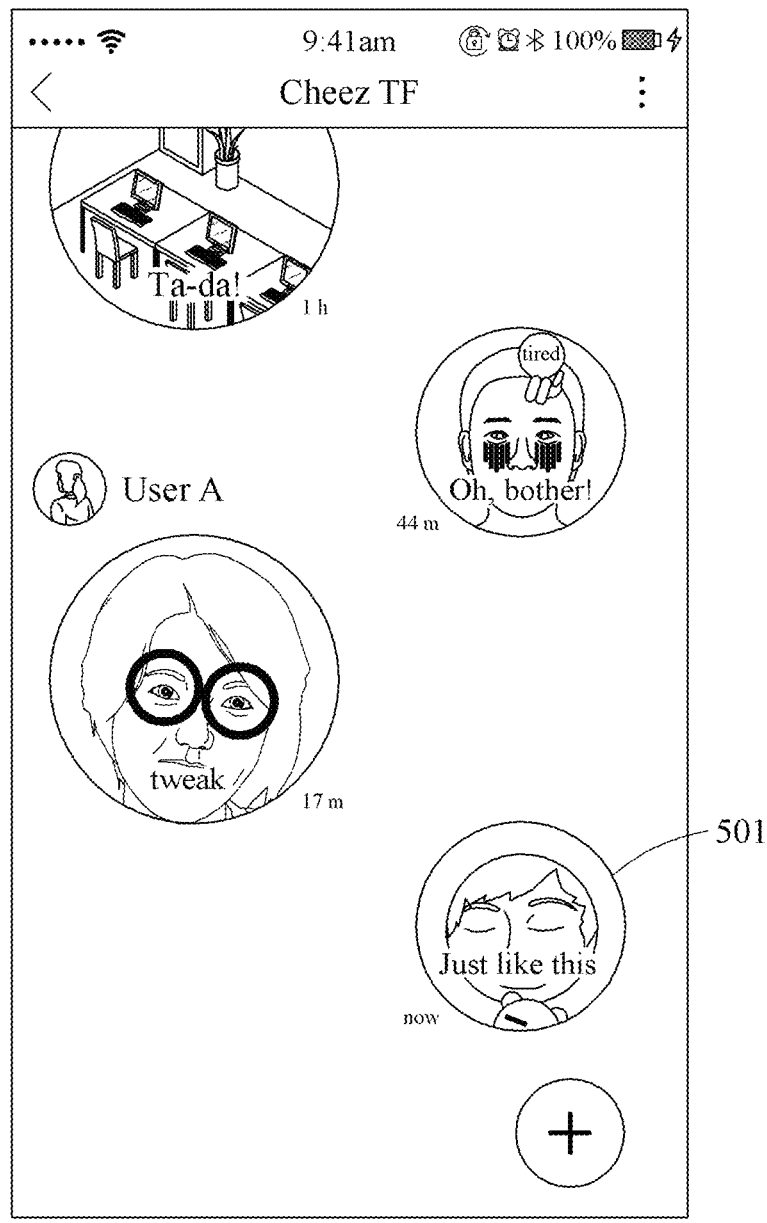
FIG. 5 is a diagram illustrating a process of sharing an animated image created according to an example embodiment.

FIG. 5 is a diagram illustrating a process of sharing an animated image created according to an example embodiment.

An animated image according to an example embodiment may be shared with a third party through a service application. The service application may include, for example, a chat application, an SNS application, and the like.

For example, during a chat with a third party using a chat application, a user may create an animated image using a menu provided through the chat application. The animated image created by the user in a chat room in which the chat with the third party is performed may be shared with the third party, as shown in FIG. 5. When a preset condition is satisfied (for example, a lapse of a period of time, performing of an event, and the like), the animated image shared with the third party may be deleted from the chat room.

Also, referring to FIG. 5, animated images created by a plurality of users participating in the chat room may be displayed in the chat room. The animated images may be set to have equal sizes. Alternatively, the animated images may be set to have different sizes for each of the users in the chat room. For example, a size of an animated image created by a user in a chat room the user is viewing may be set to be less than a reference size, and a size of an animated image created by a third party participating in the chat room may be set to be greater than the reference size. In other words, the size of the animated image created by the third party may be set to be greater than the size of the animated image created by the user, and thus the sizes of the animated images may be relatively expressed within the chat room.

In addition, an animated image selected individually by a user among animated images provided by a third party participating in a chat room may be enlarged and displayed. Furthermore, a user terminal may display an animated image that is already selected and played back by a user, and a new animated image that is not checked by the user, so that the animated images may be distinguished from each other by, for example, a difference in size between the animated images, blur processing, a mark indication, and the like.

The chat room may be a chat room created in association with a specific event. For example, when an advertiser creates a chat room for promoting a product or service, users may create animated images related to the product and/or service through the chat room and share the animated images in the chat room. For example, a user may create an animated image related to a product and/or service of an advertiser in a chat room and may register the animated image in the chat room, to participate in an event set by the advertiser.

For example, an advertiser may set a playback time of an animated image (for example, a playback time within 15 seconds), and a text displayed through an animated image (for example, a text needing to include a keyword requested by the advertiser) as conditions for participation in an event. In this example, when a user uploads an animated image that does not satisfy the above conditions, a separate notification that the animated image is to be removed may be provided to the user, or the animated image may be immediately deleted from a chat room.

Figure 6:
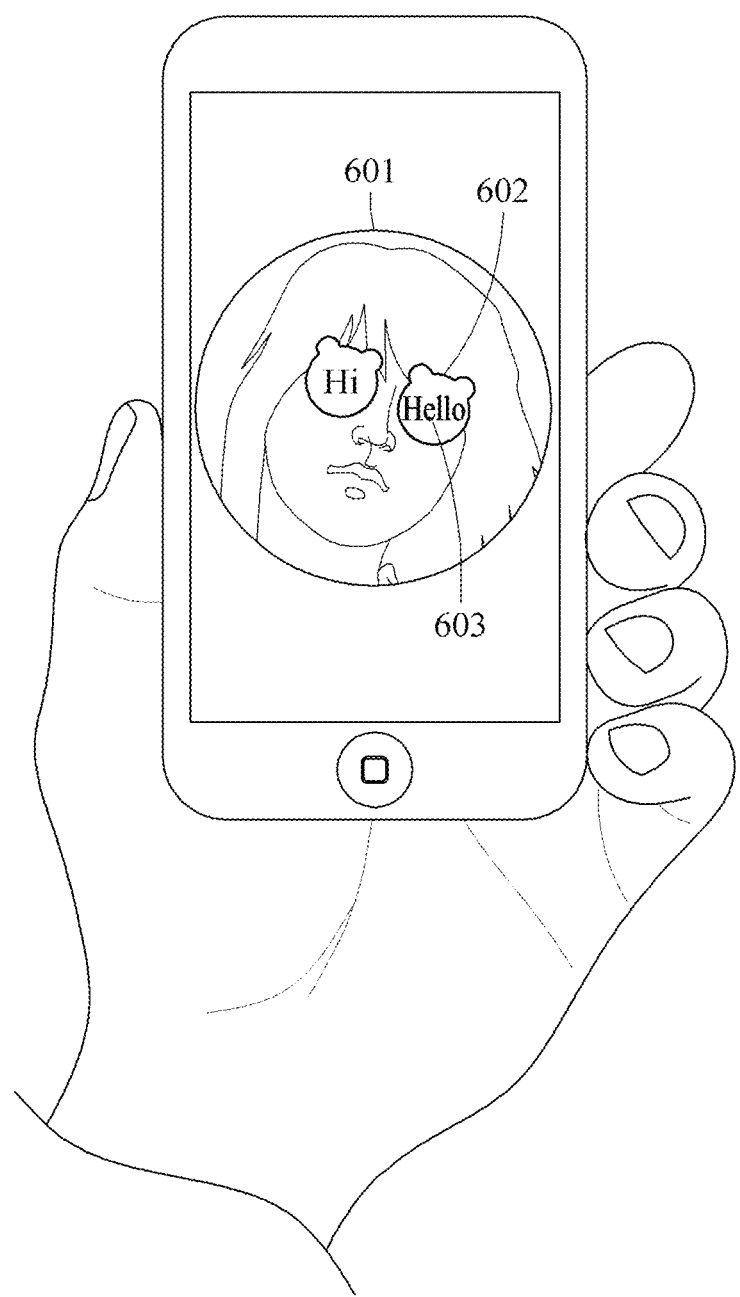
FIG. 6 is a diagram illustrating an animated image to which a sticker is applied according to an example embodiment.

FIG. 6 is a diagram illustrating an animated image to which a sticker is applied according to an example embodiment.

FIG. 6 illustrates an example in which a custom sticker 602 and a text 603 corresponding to a key input by a user are displayed together on an animated image 601.

A user terminal may determine the custom sticker 602 based on the text 603. The custom sticker 602 may be displayed in conjunction with a snapshot image acquired every time a key is input through the user terminal.

Examples of determining the custom sticker 602 are described below.

In Case 1, the custom sticker 602 may be determined by applying a theme to the text 603. In Case 1, the theme may be applied based on at least one specific point or a specific area in an image collected in real time by an activated camera of the user terminal. The theme may be set as a default in an application (randomly changed depending on circumstances), or may be set based on a user's selection.

The theme may refer to a visual effect to be applied to the text 603. For example, the theme may change based on an animation of the text 603 or an attribute of the text 603. The animation of the text 603 may be an animation effect of moving in a predetermined direction or along a trajectory over time. The attribute of the text 603 may be an effect of changing a size, a font, or a thickness of the text 603.

In an example, the text 603 may be displayed on a predetermined display area by a theme, in conjunction with an image collected in real time by the activated camera. In another example, when a theme is applied to the text 603, the text 603 may be displayed based on a specific area or a specific point of an image collected in real time by the activated camera.

In Case 2, the custom sticker 602 may be determined by combining the text 603 with a sticker that is to overlap an image collected in real time by the activated camera. In Case 2, the sticker that is to overlap the image may be determined as a default in an application (randomly changed depending on circumstances), or may be determined in response to a user's selection.

In Case 2, the sticker that is to overlap the image collected in real time by the activated camera may be displayed on a screen of the user terminal before the sticker is combined with the text 603. Alternatively, the sticker may be combined with the text 603, and may be displayed as the custom sticker 602 on the screen of the user terminal. Also, the above-described theme may be applied to the text 603.

The text 603 may be displayed on a predetermined display area by the theme or the sticker that is to overlap an image. Alternatively, the text 603 may be displayed based on a specific area or a specific point of an image collected in real time by the activated camera. The specific area or the specific point may be in a location that is overlaid or not overlaid on an object or a body part (for example, a face, or the other parts) of a user included in an image.

In Case 2, when a sticker overlaps an image collected in real time by the activated camera, the text 603 may be combined with the sticker so that the custom sticker 602 may be determined. Alternatively, the text 603 may be combined with a sticker that is to overlap the image and the text 603 and the sticker may overlap the image, so that the custom sticker 602 may be determined.

According to example embodiments, it is possible to more easily create an animated image in response to a user simply entering a key.

According to example embodiments, an animated image may be created based on a result obtained by displaying a snapshot image with a custom sticker, a text corresponding to a key input by a user, and the like, so that a third party who receives the animated image may be interested in the animated image.

The method according to example embodiments may be embodied as a program that is executable by a computer, and may be implemented as various recording media, such as a magnetic storage medium, an optical reading medium, a digital storage medium, and the like.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the present disclosure. It will be apparent to one of ordinary skill in the art that various modifications of the example embodiments may be made without departing from the spirit and scope of the claims and their equivalents.

What is claimed is:

1. A method of creating an animated image based on a key input, the method comprising:
    activating a camera of a user terminal in response to a service request;
    determining whether a key is input;
    acquiring a snapshot image including an image taken by the activated camera when the key is input, each of the key and the snapshot image being provided in plurality; and
    creating an animated image based on the acquired snapshot images, the animated image changing over time,
    wherein the key input corresponds to a text and the text is provided in plurality,
    wherein the acquiring of the snapshot image comprises:
        acquiring a snapshot image overlaid with the text corresponding to the key input on the image taken by the activated camera when the key is input, the animated image being created by combining the snapshot images overlaid with the texts corresponding to the keys; or
        acquiring a snapshot image that is not overlaid with the text corresponding to the key input on the image taken by the activated camera when the key is input, the animated image being overlaid with a sentence formed by combining the texts corresponding to the keys.

2. The method of claim 1, wherein the text corresponds to a key included in a physical keyboard of the user terminal, a key included in a virtual keyboard on a touch screen of the user terminal, or a syllable or a word recognized as speech by a speech recognition device.

3. The method of claim 1, wherein scheme information associated with an application called by selecting the animated image, or link information associated with a web page connected by selecting the animated image is set for the animated image.

4. The method of claim 1, wherein the animated image is created based on a snapshot image acquired by applying a theme to the text corresponding to the key input on the image taken by the activated camera.

5. The method of claim 1, wherein the animated image is created based on a snapshot image that shows a custom sticker combined with the text corresponding to the key input on the image taken by the activated camera.

6. The method of claim 1, wherein the animated image is created by filtering at least one snapshot image in which a body part of a user is represented beyond a predetermined threshold area, among the snapshot images acquired.

7. The method of claim 1, further comprising:
sharing the animated image with a third party through a chat room or a specific area,
wherein an animated image registered by a user is displayed to be less in size than an animated image registered by the third party in the chat room or the specific area, or
an animated image selected by a user is enlarged and displayed in the chat room or the specific area.

8. The method of claim 7, wherein while the animated image is displayed in the chat room or the specific area, when a predetermined event is satisfied, the animated image disappears.

9. A user terminal for performing a method of creating an animated image based on a key input, the user terminal comprising:
a processor,
wherein the processor is configured to:
activate a camera of a user terminal in response to a service request;
determine whether a key is input;
acquire a snapshot image including an image taken by the activated camera when the key is input, each of the key and the snapshot image being provided in plurality; and
create an animated image based on the acquired snapshot images, the animated image changing over time, wherein the key input corresponds to a text, and the text is provided in plurality,
wherein the processor is further configured to:
acquire a snapshot image overlaid with the text corresponding to the key input on the image taken by the activated camera when the key is input, the animated image being created by combining the snapshot images overlaid with the texts corresponding to the keys; or
acquire a snapshot image that is not overlaid with the text corresponding to the key input on the image taken by the activated camera when the key is input, the animated image being overlaid with a sentence formed by combining the texts corresponding to the keys.

10. The user terminal of claim 9, wherein the text corresponds to a key included in a physical keyboard of the user terminal, a key included in a virtual keyboard on a touch screen of the user terminal, or a syllable or a word recognized as speech by a speech recognition device.

11. The user terminal of claim 9, wherein scheme information associated with an application called by selecting the animated image, or link information associated with a web page connected by selecting the animated image is set for the animated image.

12. The user terminal of claim 9, wherein the animated image is created based on a snapshot image acquired by applying a theme to the text corresponding to the key input on the image taken by the activated camera.

13. The user terminal of claim 9, wherein the animated image is created based on a snapshot image that shows a custom sticker combined with the text corresponding to the key input on the image taken by the activated camera.

14. The user terminal of claim 9, wherein the animated image is created by filtering at least one snapshot image in which a body part of a user is represented beyond a predetermined threshold area, among the snapshot images acquired.

15. The user terminal of claim 9, wherein
the processor is configured to share the animated image with a third party through a chat room or a specific area, and
an animated image registered by a user is displayed to be less in size than an animated image registered by the third party in the chat room or the specific area, or
an animated image selected by a user is enlarged and displayed in the chat room or the specific area.

16. The user terminal of claim 15, wherein while the animated image is displayed in the chat room or the specific area, when a predetermined event is satisfied, the animated image disappears.

* * * * *